April 25, 1933.     H. E. IVES     1,905,469

METHOD OF PRINTING STEREOSCOPIC POSITIVES FROM INVERTED RELIEF NEGATIVES

Filed May 31, 1930

INVENTOR
Herbert E. Ives
BY
Harry Lea Dodson
ATTORNEY

Patented Apr. 25, 1933

1,905,469

UNITED STATES PATENT OFFICE

HERBERT E. IVES, OF MONTCLAIR, NEW JERSEY

METHOD OF PRINTING STEREOSCOPIC POSITIVES FROM INVERTED RELIEF NEGATIVES

Application filed May 31, 1930. Serial No. 458,305.

My invention relates more particularly to the making of positives from negatives obtained by the use of large lens, which is completely described in my copending application, Serial No. 458,303, filed May 31, 1930, in which application I have set forth a method of making stereoscopic pictures formed of a multiplicity of strip images, which I have termed "parallax panoramagrams", meaning thereby pictures showing stereoscopic relief over a wide range of distances and angles of observation.

Positives made by contact printing from negatives thus taken, must be viewed by interposing a grating between the light and the positive, and said viewing grating must be of slightly coarser spacing than the taking grating.

My present invention has for its object, to provide a method for making positives from negatives taken with a wide lens, which will not require the special viewing procedure described in my above-mentioned copending application.

This method consists, after mounting behind a grating formed of alternate opaque and transparent vertical lines an image of the negative obtained through the large lens, in projecting said image back through the same or a similar large lens, on to a sensitive plate, which is placed slightly behind another grating, also formed of alternate opaque and transparent vertical lines.

That this projection print will exhibit correct relief is readily grasped, when it is noticed that the negative, considered as a "parallax panoramagram", exhibits pseudoscopic relief when viewed through a grating identical with that used in taking, and the projection print therefrom will again be inverted in relief, this resulting in a correct final product. Or, more simply, one can consider the light beams as accurately retracing their paths through the large lens and reconstructing a virtual object.

For illsutrative purposes, I have annexed to this specification, to be considered as a part thereof, a diagrammatic drawing, showing how to make, from negatives taken in the manner set forth in my aforementioned copending application, positives which will present correct relief when viewed without the interposition of a specially made viewing grating, in which—

Similar reference numerals refer to similar parts throughout the entire description.

Figure 1:
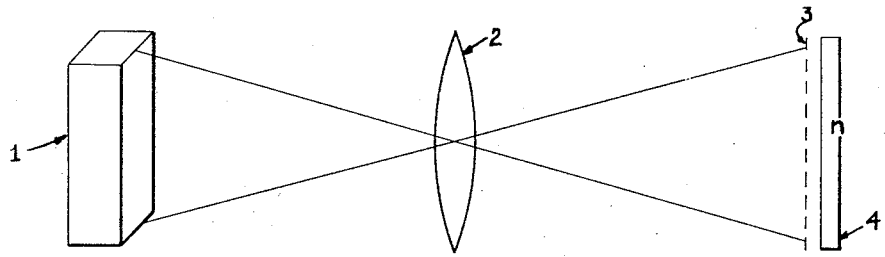
Fig. 1 is a diagrammatic view, showing how to make the negative.

As shown in the drawing, the object 1 to be photographed is indicated at the left of a large lens 2. By "large", I mean large as compared to the distance between the eyes for example, a lens of 12" diameter and 24" focal length. A taking grating 3 is interposed between the lens 2 and a sensitive plate 4 which is to form the negative.

Figure 2:
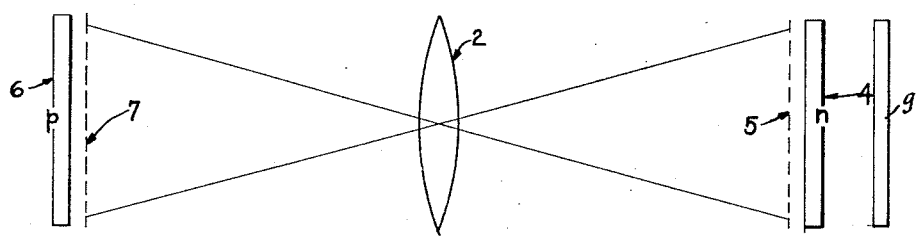
Fig. 2 is a similar view, showing how to make the positive.

After the negative is formed, it is placed as shown in Fig. 2, in which the image of the negative 4 is projected through a taking grating 5 back through the large lens 2, or a similar lens, on to a sensitive plate 6 placed slightly behind another taking grating 7. These lines are preferably arranged 50 lines per inch, the opaque spaces being ten times the width of the clear spaces between; the plate and grating corresponding in size, the image on the negative should extend over the whole plate. The result of this procedure is, that the positive 6 thus produced will give correct relief.

In practice, some difficulty may be encountered, which is caused by the image of the grating 5 falling upon the grating 7, thus producing interference, or moiré patterning, which prevents the picture being perfect. Where this difficulty appears in practice, it can be avoided by focusing the image of the negative some distance in front of or behind the positive 6, so that the lines of the grating 5 are no longer clearly defined. It is true that this will change the relative position of the photographed object with respect to the plane of the picture, but as this displacement will amount to only an inch or two—which is found sufficient to avoid patterning—it does not constitute a serious objection. The distance is dependent on the size of the lens and the distance of the lens from the grating, as used. If the above size of lens is 48" from the grating, the condition when an image is formed of the same size as the object, the sensitized plate should be .08". This is determined in the following manner:

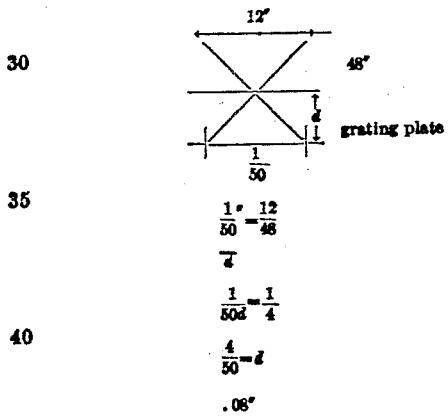

Place the grating some distance in front of or behind the picture 6, so that the lines of the grating 5 are no longer clearly defined. This will bring into sharpest focus a plane of the original object slightly in front of or behind the plane of the negative. This will merely change the relative position of the photographed object with respect to the plane of the picture, but as there is no regular relationship between the sensitized plate and its grating preferably the negative should be treated as if it were an object to be photographed.

Another method of overcoming this interference is to mount both gratings 5 and 7 at an angle to the horizontal. Thus, if one grating is at 45° and the other at 135°, their lines are mutually perpendicular, and no patterning occurs, while the result of the separation of the grating from the plate, which is relied upon to produce relief, will be preserved.

Figure 3:
Fig. 3 shows an arrangement of grating and sensitive plate which is most desirable when the grating or other structure, such as lenticular ridges, relied upon to isolate the various points of view, is integral with the sensitive plate.
Figure 5:
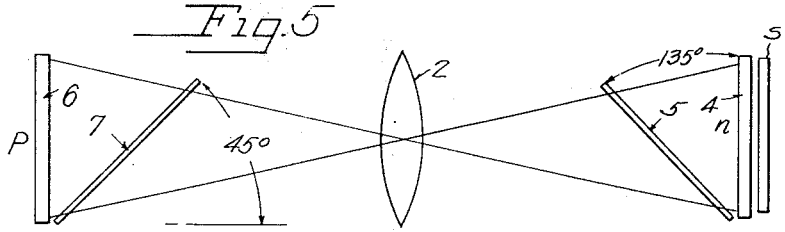
Fig. 5 is a diagrammatic side view showing the means of overcoming the tendency of moiré patterning by placing the gratings at an angle.
Figure 4:
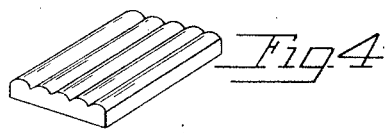
Fig. 4 is a perspective view of a grating having lenticular ridges.

The foregoing method possesses a very considerable advantage over contact printing procedure, when the grating or other structure, such as lenticular ridges, shown in Fig. 4, employed, is formed integral with the sensitive plate, as shown in Fig. 3, which discloses a transparent plate B, of glass or celluloid. A grating G is permanently adherent to the plate B. It may be either ruled or photographically printed thereon. A sensitive emulsion layer S is on the other side of the transparent plate B. If the sensitive emulsion layer S has printed upon it an appropriate image of juxtaposed strips, each accurately in register with a clear space in the grating B, a "parallax panoramagram" of simple form, permanently in register, is obtained.

It is very difficult, by any contact printing method, to secure absolutely accurate positioning of the printing negative opposite the grating lines, particularly in connection with the use of celluloid or other material which is subject to distortion and change of size with temperature and atmospheric conditions. However, by following the projection printing method diagrammatically illustrated in Figs. 1 and 2, the printing of relief pictures, in the convenient form illustrated in Fig. 3, becomes comparatively simple.

Having described my invention, what I regard as new, and desire to obtain by Letters Patent of the United States, is:

1. The method of printing stereoscopic positives from inverted relief negatives, which consists of projecting the image on the negative through a large lens and a grating located between said negative and said lens, on to a sensitive plate placed slightly behind another similar grating, both of said gratings being formed of alternate opaque and transparent vertical lines.

2. The method of printing stereoscopic positives from inverted relief negatives, which consists of projecting the image on the negative through a lens wider than the object to be photographed and a grating located between said negative and said lens, on to a sensitive plate placed slightly behind another similar grating, both of said gratings being formed of alternate opaque and transparent vertical lines.

3. The method of printing stereoscopic positives from inverted relief negatives, which consists of projecting the image on the negative through a lens of width comparable in diameter to the object to be photographed and a grating located between said negative and said lens, on to a sensitive plate placed slightly behind another similar grating, both of said gratings being formed of alternate opaque and transparent vertical lines.

4. The method of printing stereoscopic positives from inverted relief negatives, which consists of projecting the image on the negative through a large lens and a grating located between said negative and said lens, on to a sensitive plate having a lined grating permanently adherent thereto, both of said gratings being formed of alternate opaque and transparent vertical lines.

5. The method of printing stereoscopic positives from inverted relief negatives, which consists of projecting the image on the negative through a large lens and a grating located between said negative and said lens, on to a sensitive plate placed slightly behind another similar grating, both of said gratings being formed of alternate opaque and transparent vertical lines, said gratings being mounted at an angle to the horizontal with their lines mutually perpendcular.

6. The method of printing stereoscopic positives from inverted relief negatives, which consists of projecting the image on the negative through a lens wider than the object to be photographed and a grating located between said negative and said lens, on to a sensitive plate placed slightly behind another similar grating, both of said gratings being formed of alternate opaque and transparent vertical lines, said gratings being mounted at an angle to the horizontal with their lines mutually perpendicular.

7. The method of printing stereoscopic positives from inverted relief negatives, which consists of projecting the image on the negative through a lens of width comparable in diameter to the object to be photographed and a grating located between said negative and said lens, on to a sensitive plate placed slightly behind another similar grating, both of said gratings being formed of alternate opaque and transparent vertical lines, said gratings being mounted at an angle to the horizontal with their lines mutually perpendicular.

8. The method of printing stereoscopic positives from inverted relief negatives, which consists of projecting the image on the negative through a large lens and a grating located between said negative and said lens, on to a sensitive plate having a lined grating permanently adherent thereto, both of said gratings being formed of alternate opaque and transparent vertical lines, said gratings being mounted at an angle to the horizontal with their lines mutually perpendicular.

9. The method of printing stereoscopic positives from inverted relief negatives, which consists of projecting the image on the negative through a large lens and a grating located between said negative and said lens, on to a sensitive plate placed slightly behind another similar grating, both of said gratings being formed of alternate opaque and transparent vertical lines, said gratings being mounted at an angle to the horizontal, one at an angle of 45° and the other at an angle of 135°.

10. The method of printing stereoscopic positives from inverted relief negatives, which consists of projecting the image on the negative through a large lens and a grating located between said negative and said lens, on to a sensitive plate placed slightly behind another similar grating, both of said gratings being formed of lenticular ridges.

11. The method of printing stereoscopic positives from inverted relief negatives, which consists of projecting the image on the negative through a lens wider than the object to be photographed and a grating located between said negative and said lens, on to a sensitive plate placed slightly behind another similar grating, both of said gratings being formed of lenticular ridges.

12. The method of printing stereoscopic positives from inverted relief negatives, which consists of projecting the image on the negative through a lens comparable in diameter to the object to be photographed and a grating located between said negative and said lens, on to a sensitive plate placed slightly behind another similar grating, both of said gratings being formed of lenticular ridges.

13. The method of printing stereoscopic positives from inverted relief negatives, which consists of projecting the image on the negative through a large lens and a grating located between said negative and said lens, on to a sensitive plate having a lined grating permanently adherent thereto, both of said gratings being formed of lenticular ridges.

14. The method of printing multi-strip stereoscopic positives from multi-strip inverted relief negatives, which consists of projecting the image on the negative through a large lens and a grating located between said negative and said lens, on to a sensitive plate placed slightly behind another grating, one or both of said gratings being formed of lenticular ridges.

15. The method of printing multi-strip stereoscopic positives from multi-strip inverted relief negatives, which consists of projecting the image on the negative thorugh a large lens and a grating located between said negative and said lens, on to a sensitive plate placed slightly behind another grating, one or both of said gratings being formed of lenticular ridges, and said gratings being mounted at an angle to the horizontal with their lines or ridges substantially mutually perpendicular.

16. The method of printing stereoscopic positives from inverted relief negatives which consists of projecting the image on the negative through a large lens and a grating located between said negative and said lens on to a sensitive plate placed slightly between another similar grating, both of these gratings being formed of elements, each of which is adapted to restrict the distribution of light under and above it.

17. The method of printing stereoscopic positives from inverted relief negatives which consists of projecting the image on the negative through a lens wider than the object to be photographed, and a grating located between said negative and said lens on to a sensitive plate placed slightly between another similar grating, both of these gratings being formed of elements each of which is adapted to restrict the distribution of light under and above it.

HERBERT E. IVES.